July 21, 1953 J. C. MANLEY 2,646,534

ELECTRONIC COUNTER

Filed Oct. 20, 1950 2 Sheets-Sheet 1

Inventor

JOHN C. MANLEY

By [signature]

Attorney

July 21, 1953 J. C. MANLEY 2,646,534

ELECTRONIC COUNTER

Filed Oct. 20, 1950 2 Sheets-Sheet 2

Inventor
JOHN C. MANLEY

By [signature]

Attorney

Patented July 21, 1953

2,646,534

UNITED STATES PATENT OFFICE 2,646,534

ELECTRONIC COUNTER

John C. Manley, Barrington, R. I., assignor, by mesne assignments, to Reconstruction Finance Corporation, Boston, Mass., a corporation of the United States Application October 20, 1950, Serial No. 191,306

15 Claims. (Cl. 315—166)

This invention relates to circuit systems employing electron tubes interconnected and operable to function as electronic counters, commutators, or the like, and particularly to such circuit systems employing gaseous discharge tubes such as glow discharge diodes.

As in a previous system devised by me and disclosed in an article "Neon Diode Ring Counter" in the January 1950 issue of "Electronics," my present system which is the subject of this invention uses neon glow lamps and rectifiers arranged in coupled stages and takes advantage of the difference between the striking and operating voltages of the neon lamps. My previous system, however, demanded stages of two different circuit configurations, one stage having one configuration, the next having the other configuration, the third having the first configuration, and so on, with the stages alternating in configuration.

In contradistinction, the present invention contemplates a circuit system serviceable as a counter, commutator or the like, which, although of the same general type as my previous system, may be composed of stages all of identical circuit configuration. Whereas my previous system required an even number of stages in a ring, my present novel system, since its stages are of identical configuration, may have an odd or an even number of stages connected into a ring. Another important advantage of my present system is that it provides very desirable uniformity in the generation of output signals by the stages. A further advantage of my present system lies in its simplicity, ease and economy of manufacture.

More specifically, the present invention has for an object the provision of an electronic counter, commutator, or the like, which is composed of successive circuits each having the same arrangement of a discharge tube, such as a gaseous discharge diode, and an impedance, such as a rectifier, providing low forward and high inverse resistance, with all the stages being identically coupled each to the next by means such as capacitors.

As in my previous device, successive changes in the voltage supplied to my present device cause conduction to step from neon lamp to neon lamp around the ring, but whereas my previous device required the rectifiers and interstage coupling capacitors to be connected to different sides of the neon lamps of alternate stages, my present device may have the rectifiers and coupling capacitors all connected to the same sides of the neon lamps of all the stages.

A distinctive feature of my present device is that the interstage coupling capacitors are each connected to opposite poles of the respective rectifiers of adjacent stages.

More specifically, according to the present invention, an electronic counter, commutator, or the like, is provided which involves identical stages, each including the same circuit arrangement of glow lamp, rectifier and resistor means, in which interstage coupling capacitors connect opposite poles of the respective rectifiers of adjacent stages, and in which successive changes in supply voltage for the system act through the capacitors to transfer conduction from one glow lamp to the next.

In a preferred embodiment of the invention, the rectifiers, resistor means and interstage coupling capacitors are all arranged at the lower or cathode side of the glow lamps of the stages. In an alternative embodiment, the rectifiers, resistors, and capacitors are all on the upper or anode side of the lamps.

The above and other objects of the invention will become more explicit from the following detailed description and from the claims and the appended drawings, in which:

The circuit network may have any desired number of stages, odd or even, and the stages may or may not be connected into a ring, as desired. As illustrated, the network is shown as composed of a decade or ring of ten stages which is suitable for use as an order of a tens notation counter or accumulator or frequency divider. To simplify the drawings, the fifth to eighth stages of the decade are not shown in either Fig. 1 or Fig 4.

Figure 1:
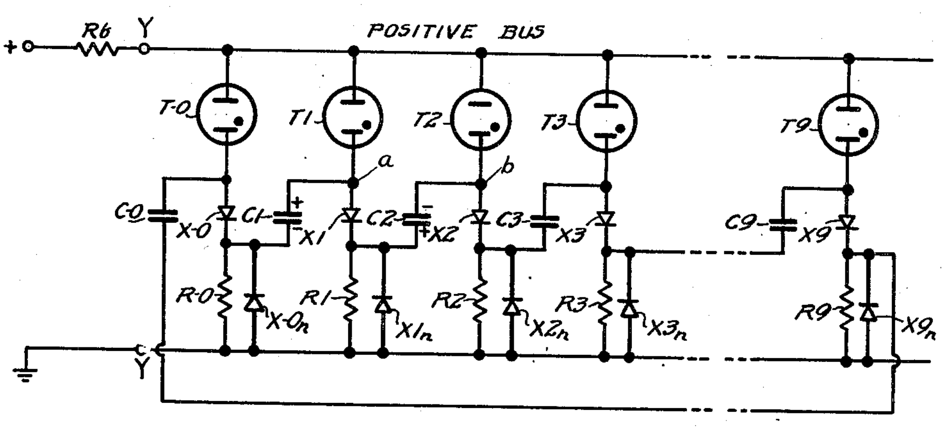
Fig. 1 shows the basic, cathode-coupled form of the invention.
Figure 3:
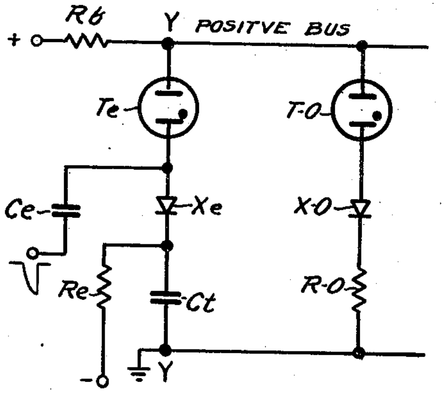
Fig. 3 illustrates a suitable triggering circuit for the Fig. 1 arrangement.

Referring now to Fig. 1, showing the basic cathode-coupled circuit, the successive stages of the decade may be referred to as the 0 to 9 stages and the similar components of these stages may be given general reference designation and further identified by numerals indicative of the stages to which they pertain. The stages are identical and each consists of a glow discharge diode T, a rectifier X, and a resistor R in series. Coupling capacitors C interconnect the stages. One electrode of each diode T is connected to a common positive bus which is returned to the positive terminal of a suitable voltage source through a resistor Rb. Points Y—Y connect to the triggering circuit, as shown in Fig. 3. Considering the 0 stage, the anode of tube T-0 is connected to the positive bus, the cathode of this tube is connected to the positive side of the rectifier X-0, and the negative side of the rectifier is connected to the upper end of the resistor R-0 which terminates at the negative, grounded bus. The coupling capacitor C1 is connected between the negative electrode of rectifier X-0 and the positive electrode of rectifier X1 of the second stage 1. The ring is completed by the coupling capacitor C-0 between the first stage 0 and the last stage 9.

Figure 2:
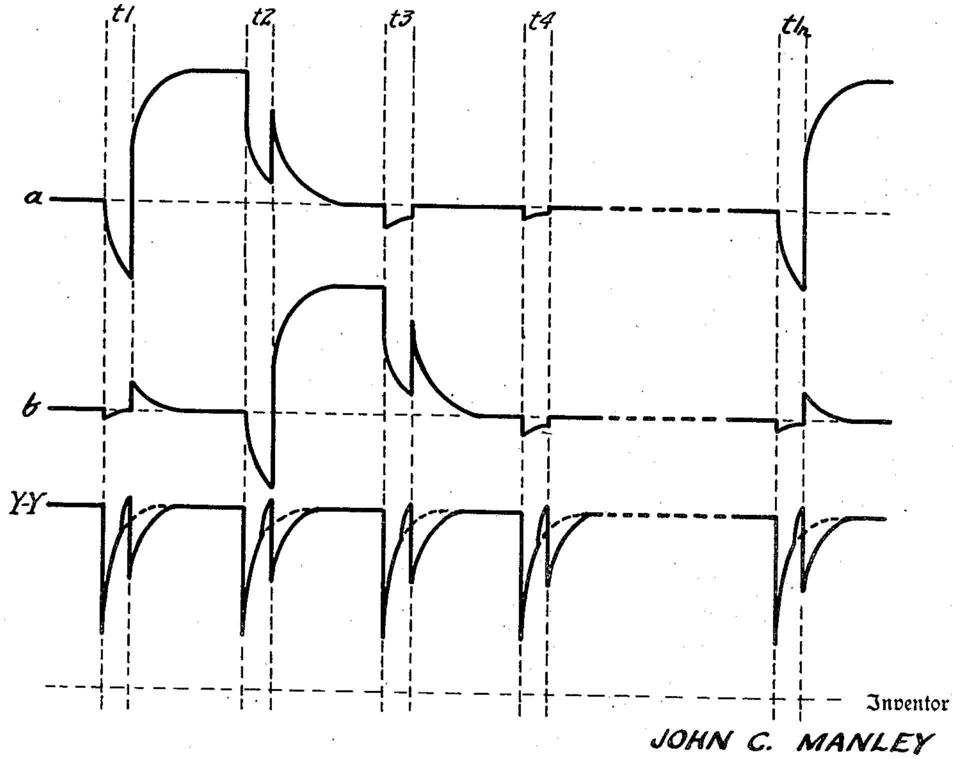
Fig. 2 shows the voltage wave forms at certain points of the Fig. 1 circuit.

Suppose that tube T1, in a manner which will become clear, is caused to strike at the end of the triggering interval t1 (Fig. 2). Current flows from the source of voltage through Rb, T1, X1, and R1 to ground. During the time between intervals t1 and t2, capacitors C1 and C2 become charged with the polarity shown in Fig. 1, C2 charging through the forward resistance of rectifiers X1 and X2. The values of Rb, R1, and the supply voltage are so chosen that the positive bus is maintained during the quiescent period between triggering intervals less than the striking voltage of the diodes, but greater than the extinction voltage, so that after one tube has been ignited there is no tendency for any other tube to strike.

Now suppose that at the beginning of triggering interval t2 (Fig. 2), the triggering circuit connected to points Y—Y reduces the voltage of the positive bus sufficiently to extinguish the tube T1 and maintains this reduction of voltage for a sufficient length of time to allow complete deionization of T1. During the triggering interval t2, no one of the tubes is conducting. Capacitor C1 discharges through X1, R1, R-0, X-0, C-0, r9, and so on with the result that the lower electrodes of T-0, T9 and T3 to T8 become slightly negative with respect to ground. Rectifiers X1, X-0, X9, and X8 to X3 conduct in the forward direction and offer minimum resistance to the discharge of C1. However, C2 discharges relatively slowly through R1, R2, and the inverse resistance of X2. The high inverse resistance of X2 causes a very large proportion of the voltage across C2 to appear between point b and ground. Thus, the lower electrode of T2 becomes significantly negative, during interval t2, with respect to ground, and when the bus voltage is allowed to increase again at the end of interval t2, a greater voltage appears across tube T2 than across any other tube. The voltage thus appearing across T2 is sufficient to ignite it, while the potential across the other tubes is insufficient to ignite them. As T2 strikes, the polarity of the charge on C2 is reversed rapidly and both C2 and C3 charge to the potential indicated in part b of Fig. 2, during the period between the triggering intervals t2 and t3. The circuit assumes a new stable condition with T2 conducting instead of T1 and thus the circuit has been stepped to its next position.

The wave forms at points a and b are indicated in Fig. 2. Succeeding triggering pulses cause the repetition of the cycle of events for advancing the state of conduction from tube to tube around the ring. A series of ten such pulses will again cause the tube T1 to be ignited during the triggering interval marked t1r. It is to be noted that the extraneous slight negative dips at the cathodes of the tubes, such as appear at point a during the intervals t3, t4, etc. may be eliminated by shunting the resistors R-0 to R9 by rectifiers X-0n to X9n, respectively, as indicated in Fig. 1. However, the provision of such rectifiers is optional.

Any suitable triggering circuit which will produce pulses, across the terminals Y—Y, of the general form indicated in line Y—Y of Fig. 2 and not necessarily of itself producing pulses having a second drop at the end of the triggering interval may be used. As illustrated, the triggering circuit shown in Fig. 3 may be used. The triggering circuit is required to produce in each triggering interval a depression of the positive bus voltage far enough and long enough to allow deionization of the conducting one of the glow tubes and within this limitation to allow recovery of the bus voltage to proceed as quickly as possible so that the coupling capacitor between the previously conducting tube and the next tube discharges as little as possible during the triggering interval, so that maximum priming of the next tube occurs. Following the triggering interval, the bus voltage returns to its quiescent value, sufficient to maintain the ignited tube in ionized state and insufficient to ignite any other tube.

The triggering circuit shown in Fig. 3 meets the above requirements. Assume the triggering, glow tube Te is initially non-conducting and that T1 in the ring (Fig. 1) is conducting. The triggering tube is held to a quiescent voltage within about 10 volts of its striking voltage by a negative priming voltage applied through a resistor Re. Assume now that a sharp negative impulse is applied via a capacitor Ce to the cathode of the tube Te, and is sufficient to increase the voltage across the tube to the striking value. As Te strikes, the voltage of the positive bus drops abruptly, as indicated in the bottom line of Fig. 2, at the beginning of interval t2. The tube T1 thereupon extinguishes and the voltage of the positive bus begins to rise again as capacitor Ct charges through Rb, Te, Xe and Re. The coupling capacitor Ce can usually be made sufficiently small that the time constant of the recovery of the bus voltage is dependent primarily on Ct, Rb and Re. This time constant is adjusted to allow deionization of the conducting tube in the ring before the bus voltage has recovered sufficiently to cause the next tube in the ring to strike. The recovery of the bus potential is allowed to proceed as quickly as possible, however, while the cathode of the tube following the just extinguished tube is still held by the coupling capacitor between these tubes to substantially its maximum priming voltage. When the primed tube in the ring is ignited, the voltage of the positive bus is again depressed sufficiently to extinguish the triggering tube. Following this, the bus voltage returns to its quiescent value until the next triggering interval.

Figure 4:
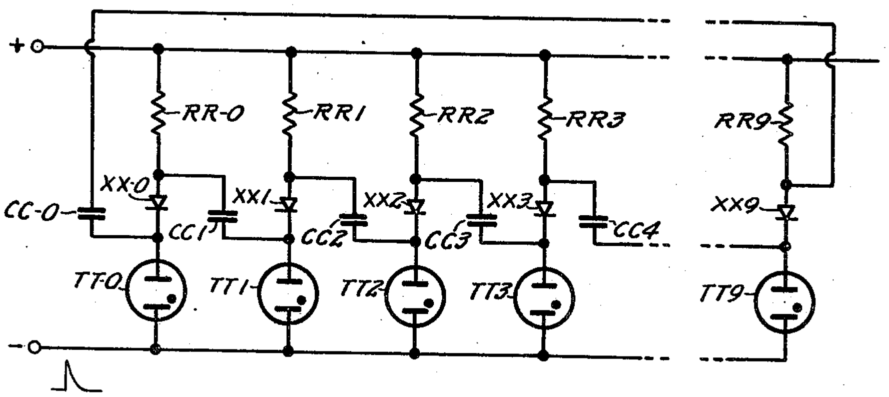
Fig. 4 shows the basic anode-coupled form of the invention.

Fig. 4 shows the basic anode-coupled form of the new circuit system. In this form, the cathodes of the glow tubes TT-0 to TT-9 are directly connected to the negative bus and the rectifiers, resistors, and interstage coupling capacitors are all on the anode sides of the glow tubes. The coupling capacitor CC1 will be charged to the polarity shown in Fig. 4 when tube TT-0 is conducting, the charging circuit being from the positive bus through the resistor RR1, the rectifiers XX1 and XX-0 in the forward direction and the tube TT-0 to the negative bus. For this form of the circuit system, it is preferred to extinguish the conducting tube by producing a transient rise in voltage on the negative bus, in any known manner. The rise in potential on the negative bus will be sufficient to extinguish the connecting tube, TT-0 for example. As the conducting tube TT-0 is extinguished, the capacitor CC1 will discharge through the inverse resistance of rectifier XX1, causing the anode of tube TT1 to become significantly positive. The capacitor discharges slowly and maintains the anode of TT1 at increased potential while the triggering rise of potential on the negative bus subsides. The resulting voltage across tube TT1 is greater than across any of the other tubes and is sufficient to ignite TT1.

Any suitable constants and tubes may be used which will produce satisfactory operation of the circuit system according to the principles outlined. For instance, satisfactory operation has been obtained with the voltage at the positive terminal of the circuit at 180 volts, with Rb having a value of about 100,000 ohms, with resistors R-0 to R9 each having a value of about 68,000 ohms, and with the capacitors C-0 to C9 each having a value between .001 and .002 microfarad. The rectifiers may be germanium crystal diodes. With the constants specified, the tubes may be of the NE96 type which fire at approximately 135 volts and operate at approximately 70 volts. With regard to the triggering circuit shown in Fig. 3, the capacitor Ce should have a value of about .003 microfarad, and the resistor Re a value of about 150,000 ohms and be returned to a negative priming voltage of about 20 volts. The quiescent voltage of the positive bus will be about 110 volts.

It should be borne in mind that in describing the invention, only the preferred embodiments were explained and shown in detail, and that many variations in the details of the circuits may be made without departing from the spirit of the invention. It is therefore intended to be limited only as indicated by the scope of the following claims.

What I claim is:

1. In an impulse controlled counting device or the like, a source of electrical potential, a chain of similar discharge circuits, each said circuit including a discharge device having one electrode connected to one side of the source, a connection from the opposite electrode of the discharge device to the other side of the source, said connection including a unidirectional device having low forward and high inverse impedance, means for producing a change in the potential applied to said discharge circuits for each control impulse, and an impulse transferring means linking each discharge circuit to the adjacent discharge circuit, said impulse transferring means including a capacitor connected to opposite sides of the respective unidirectional devices of the adjacent discharge circuits.

2. In an impulse controlled counting device or the like, a voltage supply, a chain of similar discharge circuits across the opposite sides of the supply, each said circuit including a gaseous discharge tube having an electrode connected to one side of the supply, a connection including a rectifier from the opposite electrode of the discharge tube to the other side of the supply, means for momentarily reducing the voltage across said supply for each control impulse so as to extinguish a conducting one of the discharge tubes, and impulse transferring means connected to opposite sides of the respective rectifiers of adjacent circuits for enabling ignition of a next discharge tube upon extinction of the preceding discharge tube.

3. In an impulse controlled counting device or the like, a direct voltage supply, a plurality of similar circuit stages across said supply, each stage including a gaseous discharge diode having one electrode suitably connected to one side of the supply, a connection between the opposite electrode of the diode and the other side of the supply, said connection including a rectifier, means for producing a momentary change in voltage of the supply for each control impulse, and impulse transferring means connected to opposite sides of the respective rectifiers of adjacent stages for igniting the diodes successively in response to successive changes in voltage of the supply.

4. A stepping circuit system to serve as a counter, commutator or the like, comprising opposite voltage lines, a succession of stepping stages of like circuit configuration, each stage including a gaseous discharge tube and resistive and rectifier means in series across said lines, and interstage coupling capacitors for transferring conduction from tube to tube along the succession of stages in response to sequential changes in voltage across said lines.

5. A stepping circuit system to serve as a counter, commutator or the like, comprising opposite voltage lines, a plurality of stepping stages of like circuit configuration, each stage including a gaseous discharge diode and resistive and rectifier means in series circuit across said lines, and interstage coupling capacitors, each across the resistive and rectifier means of a pair of adjacent stages, for enabling the diodes to fire in succession in response to successive similar changes in voltages across said voltage lines.

6. A stepping circuit system to serve as a counter, commutator or the like, comprising a voltage supply, a chain of stepping stages of like circuit configuration, each stage having in a similar arrangement a gaseous discharge tube, a resistor, and a rectifier in series across the voltage supply, and interstage coupling capacitors, each in circuit connection with the opposite sides of the respective rectifiers of a pair of adjacent stages, for transferring conduction from tube to tube along the chain in response to successive changes in voltage of the supply.

7. An electronic counter, commutator or the like, comprising a voltage supply, a series of tube circuits of like configuration across the opposite sides of the voltage supply, each tube circuit including a gaseous discharge diode having one electrode connected to one side of the voltage supply, a connection including a rectifier device from the other electrode of the diode to the opposite side of the supply, and coupling capacitors, each connected to the opposite terminals of the respective rectifier devices of a pair of adjacent tube circuits, for enabling the tubes of the series of circuits to be sequentially fired upon successive similar changes in voltage across the sides of the voltage supply.

8. An electronic stepping circuit system comprising a series of like tube circuits respectively including gaseous discharge diodes and rectifier devices connected to corresponding electrodes of the diodes, a voltage supply for said circuits normally supplying a voltage below diode ignition value but of a value to maintain an ignited one of the diodes in ionized state, and capacitors coupling the circuits in cascade, each capacitor being connected to a pair of tube circuits to be charged through the forward resistance of their rectifier devices upon ionization of the diode in one of the pair of circuits and to discharge through the inverse resistance of a rectifier device in one of the pair of circuits, upon extinction of the ionized tube in response to a transient drop in voltage of the supply, so as to prime the diode in the other circuit of said pair for ignition upon recovery of the voltage of the supply.

9. A counting circuit or the like, comprising a direct voltage supply having positive and negative terminals, means responsive to input pulses to reduce the voltage of said supply voltage, a plurality of gas discharge tube circuits connected in parallel across said supply, each circuit comprising a resistance having one terminal connected to a terminal of the voltage supply, a rectifier having an electrode connected to the other terminal of said resistance, a gas discharge diode connected between the rectifier and the other terminal of the voltage supply, and capacitors connecting the junction point of the resistor and rectifier of each said circuit to the junction point of the gas discharge diode and the rectifier of the following circuit.

10. A counting circuit or the like, comprising a direct voltage supply having positive and negative terminals, means responsive to input pulses to reduce the voltage of said supply voltage, a plurality of gas discharge tube circuits connected in parallel, each circuit comprising a resistance having one terminal connected to a terminal of the voltage supply, a rectifier connected to the other terminal of said resistance, a gas discharge tube connected between the rectifier and the opposite terminal of the voltage supply, and pulse transferring means between each said tube circuit and an adjacent tube circuit.

11. A counting circuit or the like, comprising a direct voltage supply having positive and negative terminals, means responsive to input pulses to reduce the voltage of said supply voltage, a plurality of gas discharge tube circuits connected in parallel, each circuit comprising a resistance having one terminal connected to the negative terminal of the voltage supply, a rectifier connected to the other terminal of said resistance, a gas discharge diode connected between the rectifier and the positive terminal of the voltage supply, and capacitors connecting the junction point of the resistor and rectifier of each said circuit to the junction point of the gas discharge diode and the rectifier of the following circuit.

12. A scaler stage comprising, in combination a voltage supply, an even or odd number of cascaded identical gas discharge tube circuits, each comprising a discharge tube, a rectifier and a resistor, said tube, rectifier and resistor being connected in series across said voltage supply, means for connecting each circuit to the next succeeding circuit and the last circuit to the first, said voltage supply being greater than the extinction potential of the discharge tubes, and means responsive to input pulses to reduce the voltage of said voltage supply during said input pulses to a value less than the extinction potential of the discharge tubes.

13. A scaler stage comprising, in combination, an odd or even number of cascaded identical gas discharge tube circuits, each consisting of a gas discharge diode, a rectifier and a resistor in series; means for connecting each circuit to the next succeeding circuit and the last circuit to the first, a voltage supply having positive and negative terminals, one of said terminals connected to an electrode of the diode of each circuit and the other terminal connected to the resistor of each circuit, said voltage supply being greater than the extinction potential of the discharge diodes, and means responsive to input pulses to reduce the voltage of said voltage supply during said input pulses to a value less than the extinction potential of the discharge diodes.

14. In an impulse counting device, a source of electrical potential, a plurality of discharge tubes conducting one at a time, a rectifier in series with each tube, impulse transferring means between each tube and the next comprising a capacitor connected to opposite sides of the rectifiers in series with the adjacent tubes, and common means for simultaneously applying each input pulse to be counted to all the tubes to transfer the conduction by action of the coupling capacitor from the conducting tube only to the next tube.

15. In an impulse counting circuit, a source of electrical potential, a plurality of counting stages of like circuit configuration, each including a discharge tube and a rectifier, and coupling capacitors between the stages, the rectifiers of adjacent stages being so poled as to present low impedance in the charging circuit of the coupling capacitor between the adjacent stages and high impedance in the discharge circuit of the coupling capacitor, one of said tubes at a time being conducting to enable the charging circuit of the coupling capactitor to be effective, and means for applying input pulses, to be counted, to the circuit, each input pulse acting on the circuit to cause the discharge circuit of the coupling capacitor to become effective for enabling the adjacent tube to become conductive.

JOHN C. MANLEY.

No references cited.